3,826,664
METHOD OF MANUFACTURING HIGH FIRE-PROOF ALUMINOUS CEMENT

Miroslaw Grylicki, Gliwice, Franciszek Nadachowski, Krakow, and Stanislaw Pawlowski, Gliwice, Poland, assignors to Instytut Materialow Ogniotrwalych, Gliwice, Poland
No Drawing. Filed Apr. 27, 1972, Ser. No. 248,140
Claims priority, application Poland, Apr. 28, 1971, P 147,837
Int. Cl. C04b 7/32
U.S. Cl. 106—104                     6 Claims

ABSTRACT OF THE DISCLOSURE

Method of manufacturing a highly fire resistant aluminous cement by sintering raw materials containing CaO, $Al_2O_3$ and 3 to 50 percent addition of $CaCl_2$, preferably 20 to 35 percent, in the temperature range between 800 and 1500° C., preferably 900 to 1300° C. The addition of $CaCl_2$ markedly lowers the temperatures of formation of calcium aluminates and enables the removal of iron and iron oxide contaminants from the cement, by the formation of volatile $FeCl_3$ and its vaporization during sintering. Instead of $CaCl_2$ other chlorides can be used, for example, $MgCl_2$, NaCl, KCl, $AlCl_3$ and others.

BACKGROUND OF THE INVENTION

(1) Field of the Invention

This invention relates to a method of producing a sintered highly resistant aluminous cement. Such cements are particularly useful as a component of fire resistant concretes used in parts of brick work of furnaces and in other constructions which are utilized at high temperatures.

(2) Prior Art

Presently cements of this type are made by sintering at temperatures of 1500° to 1700° C., a mixture of raw materials comprising CaO, such as limestones, quicklime, slaked lime, etc., with those comprising $Al_2O_3$, such as bauxites, technical alumina, aluminium hydroxide and other materials. These components are mixed in such proportions so that the molar ratio of the calcium and aluminum oxides is within 1:0.8–1:2.

The sintering of aluminous cements is a difficult technological process since the calcium aluminate synthesis, which is necessary to obtain such cements, proceeds with difficulty as a solid phase reaction. However high the temperatures employed for sintering, the reaction does not always reach the required degree. Moreover, some raw materials, especially bauxites, are fouled by substantial quantities of iron compounds which reduce the fire resistance of cement and its utility. It has been stated that it is possible to eliminate these difficulties, to radically accelerate the synthesis rate of calcium aluminates with simultaneous lowering of the sintering temperature, and to improve the purity and fire resistance of cement if calcium chloride, in any form, is applied.

SUMMARY OF THE INVENTION

In accordance with the present invention, a process for forming highly fire resistance aluminous cement from a mixture of raw materials containing CaO and $Al_2O_3$ is improved by introducing into the mixture substantial quantities of a metal chloride, e.g. 3 to 50% by weight $CaCl_2$ (based on the total weight of the raw material and the added chloride), and sintering the resultant admixture at a temperature above the melting point of the chloride, e.g. in the range of 800° to 1500° C., and preferably 900° to 1300° C.

Calcium chloride is a preferred metal chloride in this process and for convenience the discussion below will be mostly in terms of calcium chloride. However, it will be understood that the calcium chloride, which is used in the amount of 3 to 50%, and preferably 20 to 35%, may be replaced in part or entirely by other chlorides such as magnesium chloride, sodium chloride, aluminum chloride, potassium chloride, and others. The chlorides may be used in any form whether hydrated or anhydrous.

DESCRIPTION OF INVENTION

The method of manufacturing of the highly fire resistant aluminous cement according to this invention consists in introducing into the mixture of raw materials substantial quantities, from 3 to 50% or preferably from 20 to 35%, of calcium chloride in any form, whether hydrated or anhydrous, and sintering the mixture at 800° to 1500° C. or preferably at 900° to 1300° C.

Calcium chloride melts at 772° C. forming a liquid phase which considerably accelerates the reaction between the lime and aluminous components owing to the exchange of ions through the liquid. Given a sufficiently long time the desired processes can be carried out to completion at a temperature slightly exceeding the melting point of calcium chloride. However, usually it is more convenient to accelerate the reaction by using a little higher sintering temperature than 1300° C. and sometimes up to 1500° C. A choice of the optimum temperature depends on the kind of raw materials and sintering conditions.

The second important feature of sintered lime-aluminous mixtures containing calcium chloride is the reaction which proceeds therein:

$$3CaCl_2 + Fe_2O_3 \rightarrow 3CaO + 2FeCl_3$$

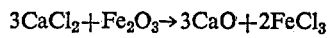

The ferric chloride product is a volatile compound which escapes from the material during sintering, thereby removing from the resultant cement ferruginous materials, expressed herein as $Fe_2O_3$. The second product of the reaction, i.e. calcium oxide, remains in the material in an active form, enabling the acceleration of the reaction with the aluminous compound of the mixture. Also, since it introduces additional CaO into the mass, the calcium chloride can partly replace raw materials usually used to provide CaO, such as limestones and hydrated lime.

The $CaCl_2$ content in the mixture of raw materials should exceed by weight the $Fe_2O_3$ content by at least 1.5 times or preferably 2 times. The sintering process is carried out in this process until the main part of the ferruginous admixture is expelled from the material in the form of $FeCl_3$.

In an advantageous embodiment of the method according to the invention, where a bauxite of high iron content is used as a raw material, the process consists in separately sintering such bauxite with an appropriate quantity of calcium chloride in order to remove $Fe_2O_3$ before the basic synthesis process of cement.

In certain cases calcium chloride can be replaced partly or entirely by a molar equivalent quantity of other chlorides such as: magnesium chloride, sodium chloride, aluminum chloride, potassium chloride, and others.

Sometimes it is more convenient to introduce water vapor or gas mixtures containing water vapor and an excess of oxygen to the kiln during the sintering, with the resultant conversion of calcium chloride into CaO. In this way calcium chloride is removed from cement after it fulfils its function of accelerating basic reactions through the liquid phase. At the same time, reactive lime produced as a product is abile to bind easily with aluminum oxide.

Cement manufactured according to the invention may contain certain quantities of $CaCl_2$ remaining after the reaction besides the main compounds, i.e. calcium aluminates. For special purposes, when it is desired to obtain cement free of chlorides, $CaCl_2$ is also removed by means of washing the granules of cement, e.g. with water or alcohol, such washing being based on the solubility of calcium chloride in water or alcohol.

EXAMPLE

A mixture composed of 20 percent by weight of technical aluminum oxide, 30 percent by weight of bauxite, 30 percent by weight of raw calcium carbonate and 20 percent by weight of calcium chloride is wet ground in a tube mill till it comes below 0.2 mm. in particle size and then it is fed into the rotary kiln in the form of a slip and sintered up to the maximum temperature of 1200° C. while applying gaseous fuel. Substantially the entire iron content of the admixture evolves from the material during sintering in the form of volatile $FeCl_3$. The $FeCl_3$ is precipitated from the cooled waste gases.

What is claimed is:

1. In a method of manufacturing a highly fire resistant aluminous cement comprising sintering a mixture of raw materials containing CaO and $Al_2O_3$ as essential components and iron-containing materials, expressed as $Fe_2O_3$, as contaminants at a temperature of 800° C. to 1500° C., the improvement comprising adding calcium chloride to said mixture in an amount of 3 percent to 50 percent by weight so as to provide an excess by weight of at least 1.5 times the $Fe_2O_3$ content, and effecting sintering for a sufficient length of time to expel a substantial amount of said iron-containing contaminants as volatile ferric chloride.

2. The method of claim 1 wherein at least a part of the calcium chloride calculated to react with said $Fe_2O_3$ is replaced at least in part by a molar equivalent quantity of a chloride selected from the group consisting of magnesium chloride, sodium chloride, potassium chloride, and aluminum chloride.

3. A method of manufacturing a highly fire resistant aluminous cement from a mixture of raw materials containing CaO and $Al_2O_3$, as essential components and iron-containing materials, expressed as $Fe_2O_3$, as contaminants, comprising adding calcium chloride to said mixture in such an amount as to provide an excess by weight of at least 1.5 times the $Fe_2O_3$ content, and effecting sintering for a sufficient length of time to expel a substantial amount of iron-containing contaminants as volatile ferric chloride.

4. The method of claim 3 wherein the calcium chloride is added to provide an excess by weight of at least 2 times the $Fe_2O_3$ content.

5. A method of claim 3, wherein the $Al_2O_3$-containing raw material has iron-containing material therein, and prior to preparing the initial mixture of raw materials, said $Al_2O_3$-containing raw material is mixed with calcium chloride and sintered to remove the iron-containing material as volatile ferric chloride.

6. A method of claim 3 wherein at least a part of the calcium chloride calculated to react with said $Fe_2O_3$ is replaced at least in part by a molar equivalent quantity of a chloride selected from the group consisting of magnesium chloride, sodium chloride, potassium chloride, and aluminum chloride.

References Cited

FOREIGN PATENTS

| | | | |
|---|---|---|---|
| 3,502 | 1967 | Japan | 106—104 |
| 251,618 | 1925 | Great Britain | 106—104 |

DELBERT E. GANTZ, Primary Examiner

J. W. HELLWEGE, Assisant Examiner